US008910226B2

(12) United States Patent
Yamagishi

(10) Patent No.: US 8,910,226 B2
(45) Date of Patent: Dec. 9, 2014

(54) TRANSMITTING APPARATUS, TRANSMITTING METHOD, RECEIVING APPARATUS, RECEIVING METHOD, PROGRAM, AND CONTENT DISTRIBUTION SYSTEM

(75) Inventor: Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/976,116

(22) PCT Filed: Jan. 5, 2012

(86) PCT No.: PCT/JP2012/050059
§ 371 (c)(1),
(2), (4) Date: Jun. 26, 2013

(87) PCT Pub. No.: WO2012/096202
PCT Pub. Date: Jul. 19, 2012

(65) Prior Publication Data
US 2013/0305303 A1 Nov. 14, 2013

(30) Foreign Application Priority Data

Jan. 12, 2011 (JP) ................................ 2011-003597

(51) Int. Cl.
*H04N 7/173* (2011.01)
*G06F 15/16* (2006.01)
(Continued)

(52) U.S. Cl.
CPC ......... *H04N 21/4622* (2013.01); *H04N 21/631* (2013.01); *H04N 21/64322* (2013.01); *H04N 21/234309* (2013.01); *H04N 21/44209* (2013.01)
USPC ............ 725/109; 709/227; 709/230; 709/231

(58) Field of Classification Search
CPC ..................... H04B 17/0042; H04L 29/08306; H04N 21/44209; H04N 21/4622; H04N 21/63; H04N 21/631; H04N 21/632
See application file for complete search history.

(56) References Cited

U.S. PATENT DOCUMENTS

| 7,945,205 B1 * | 5/2011 | Mikan et al. ................. 455/3.03 |
| 2007/0094366 A1 * | 4/2007 | Ayoub ............................ 709/223 |
| 2009/0116412 A1 | 5/2009 | Yanagihara |
| 2009/0287820 A1 * | 11/2009 | Okazaki ........................ 709/225 |

(Continued)

FOREIGN PATENT DOCUMENTS

| JP | 2003-296288 | 10/2003 |
| JP | 2009-117944 | 5/2009 |
| JP | 2010-74360 | 4/2010 |

OTHER PUBLICATIONS

International Search Report issued Mar. 27, 2012 in PCT/JP2012/050059.

(Continued)

*Primary Examiner* — Nathan Flynn
*Assistant Examiner* — James R Marandi
(74) *Attorney, Agent, or Firm* — Oblon, Spivak, McClelland, Maier & Neustadt, L.L.P.

(57) ABSTRACT

A transmitting apparatus, a transmitting method, a receiving apparatus, a receiving method, a program, and a content distribution system capable of stably supplying content to a plurality of terminal devices. A terminal device can receive content streaming distribution from a content distribution server over the Internet. In addition, the terminal device can relay the received content to a different terminal device over the Internet. If the quality of the content distributed in such a manner is degraded (e.g., the amount of delay increases), the content distribution server can control a TV broadcasting apparatus to streaming-distribute the content by on-air broadcast. In addition, the content distribution server can stop broadcasting of the content in accordance with the number of viewers.

18 Claims, 15 Drawing Sheets

(51) Int. Cl.
*H04N 21/63* (2011.01)
*H04N 21/643* (2011.01)
*H04N 21/2343* (2011.01)
*H04N 21/462* (2011.01)
*H04N 21/442* (2011.01)

(56) References Cited

U.S. PATENT DOCUMENTS

2002/0065922 A1* 5/2002 Shastri ................... 709/227

(Continued)

OTHER PUBLICATIONS

International Search Report issued Feb. 7, 2012 in PCT/JP2012/050059 (with English translation of category of cited documents).

N. Zong, et al., "P2P Streaming Protocol (PPSP) Requirements draft-ietf-ppsp-reqs-00", IETF Internet—Draft, Oct. 15, 2010, 14 pages.

Takafumi Tanaka, et al., A Study on P2P Video Streaming with Transcoding, IEICE Technical Repot, vol. 108, No. 458, 2009, pp. 405-410.

* cited by examiner

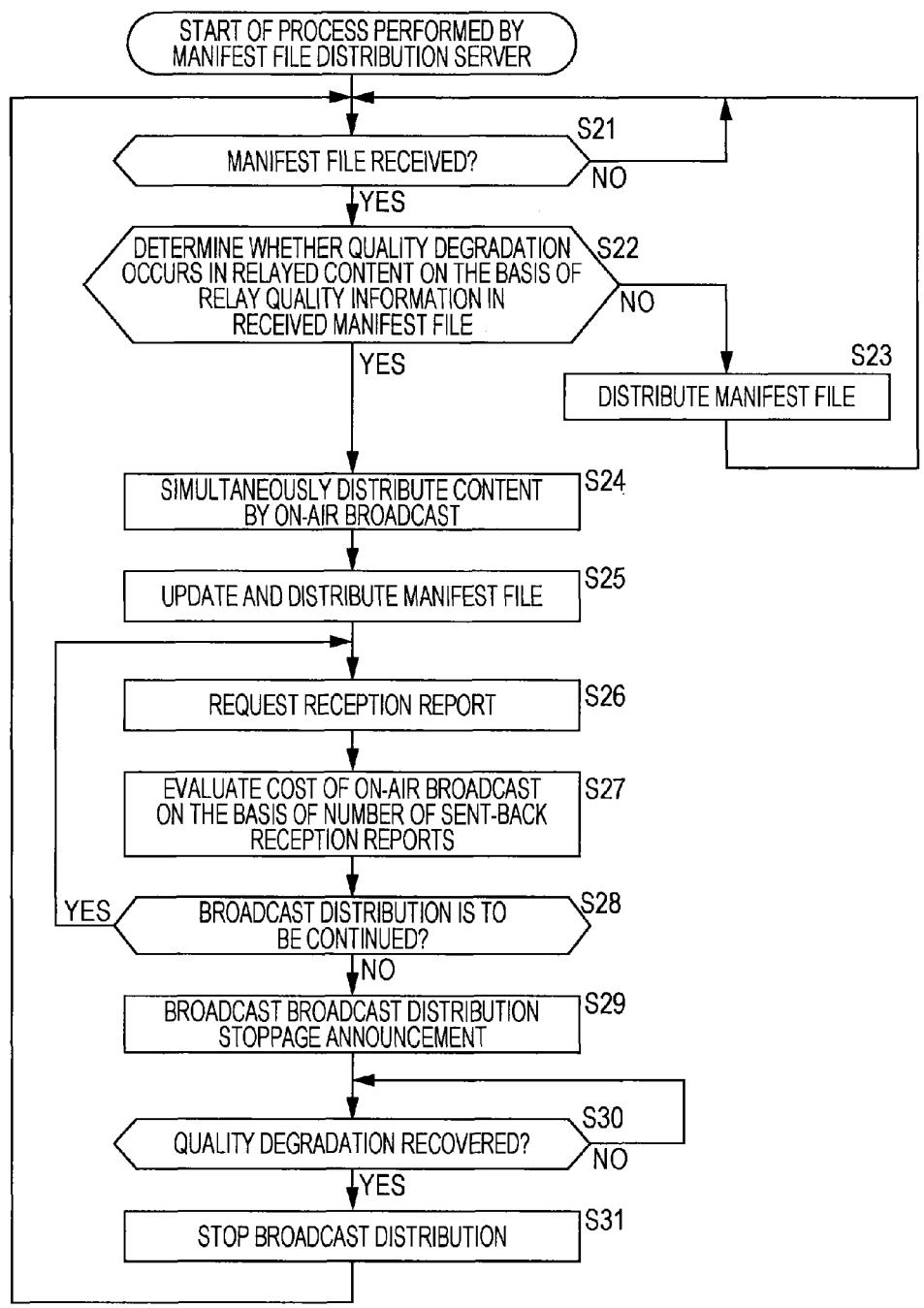

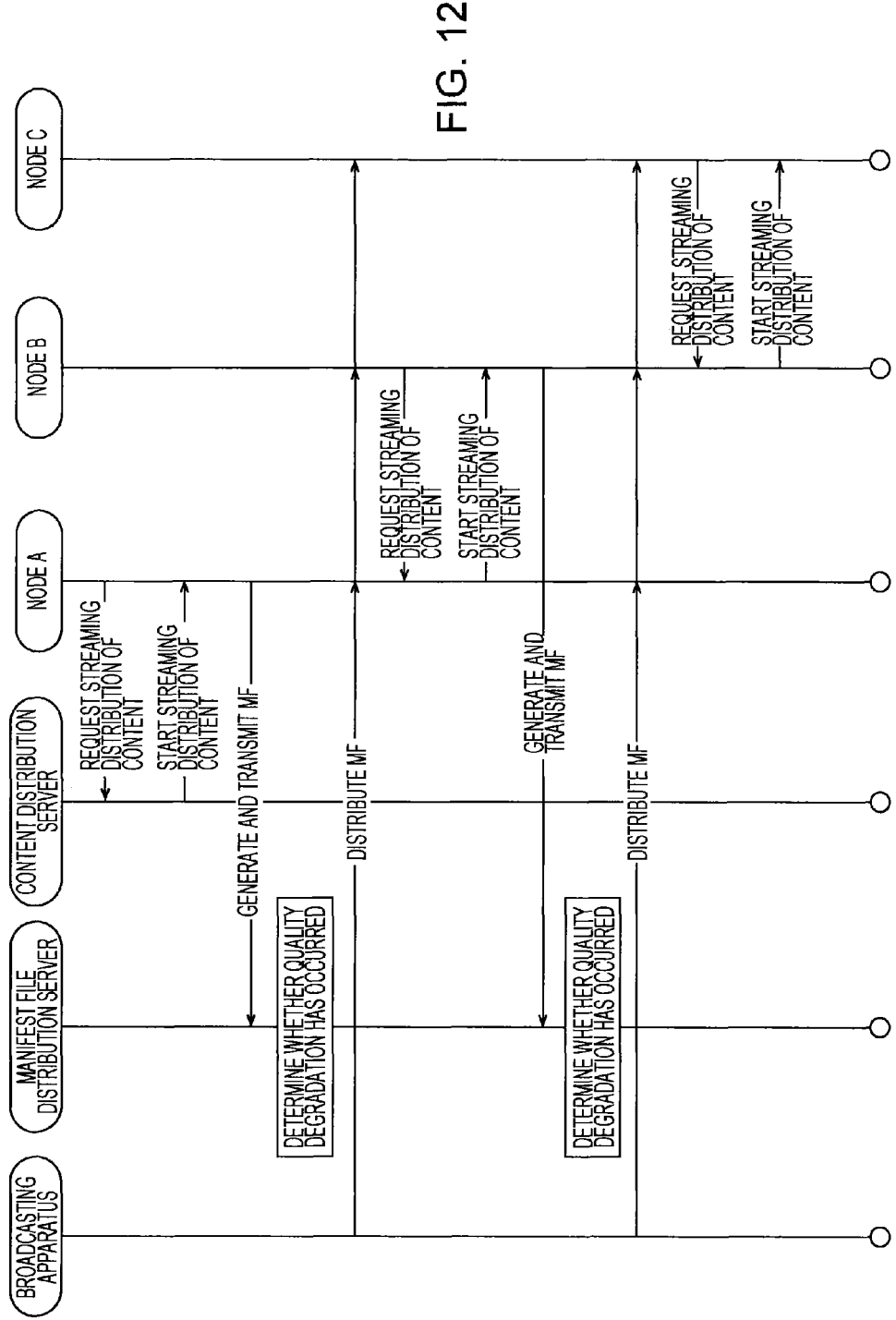

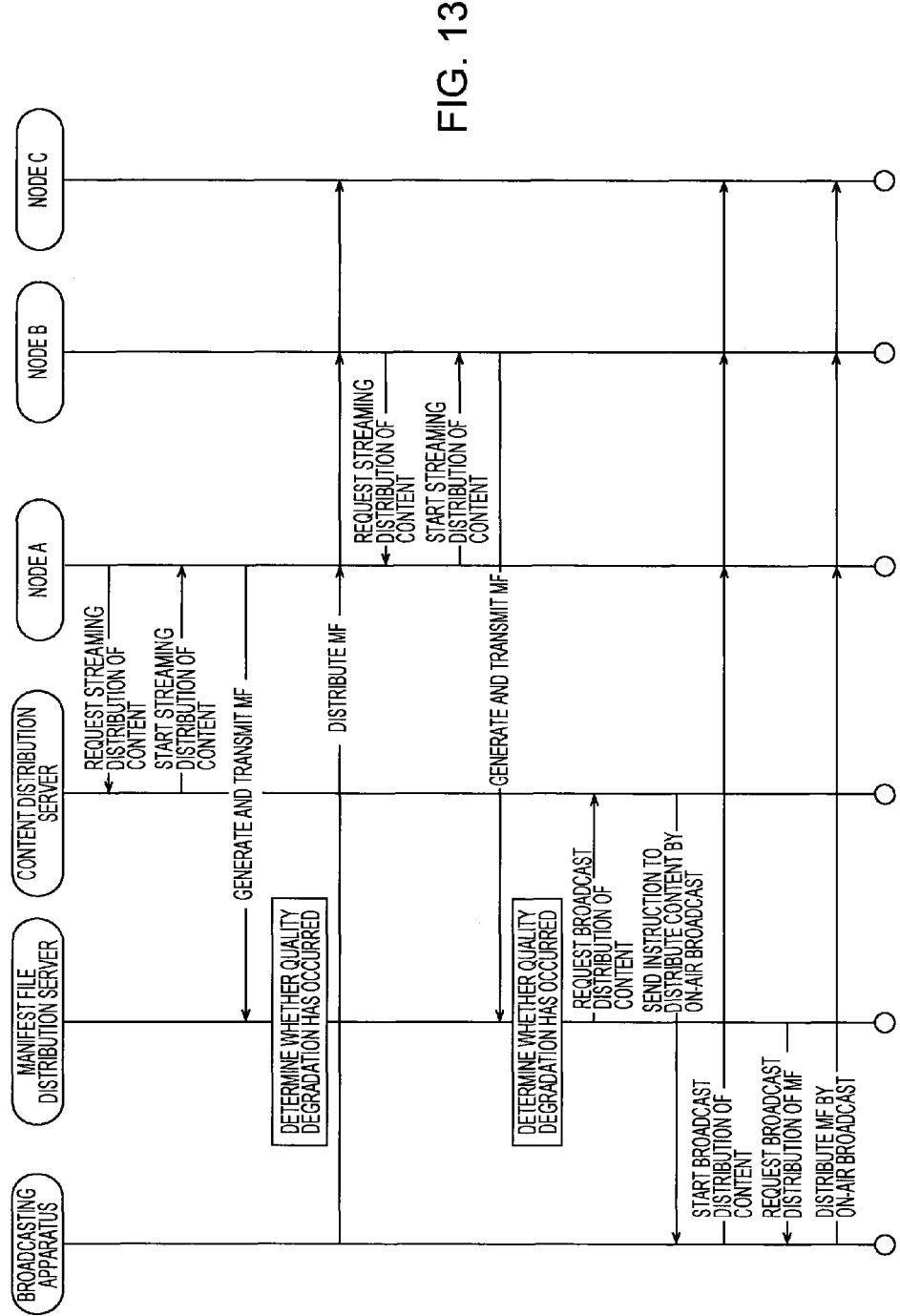

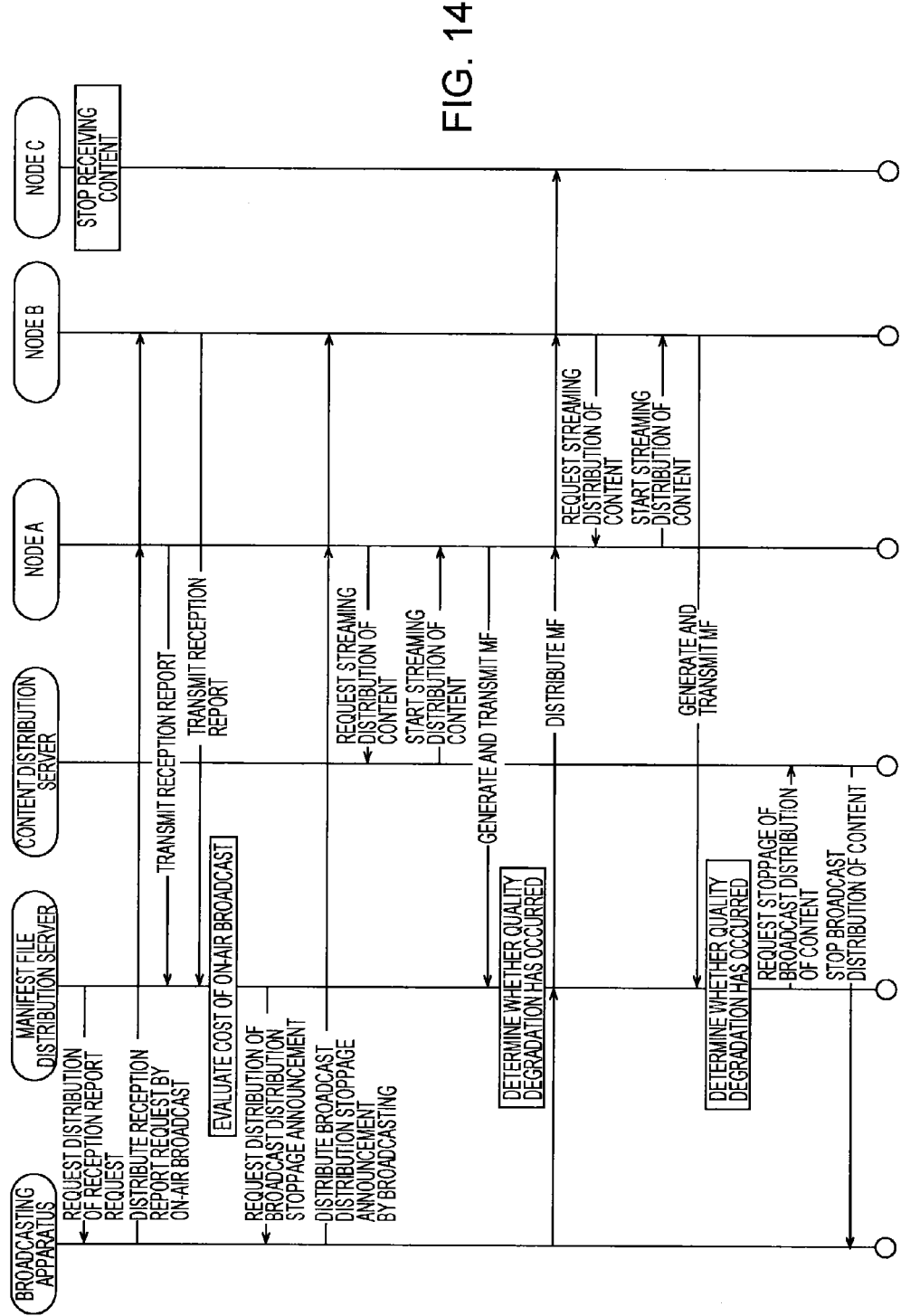

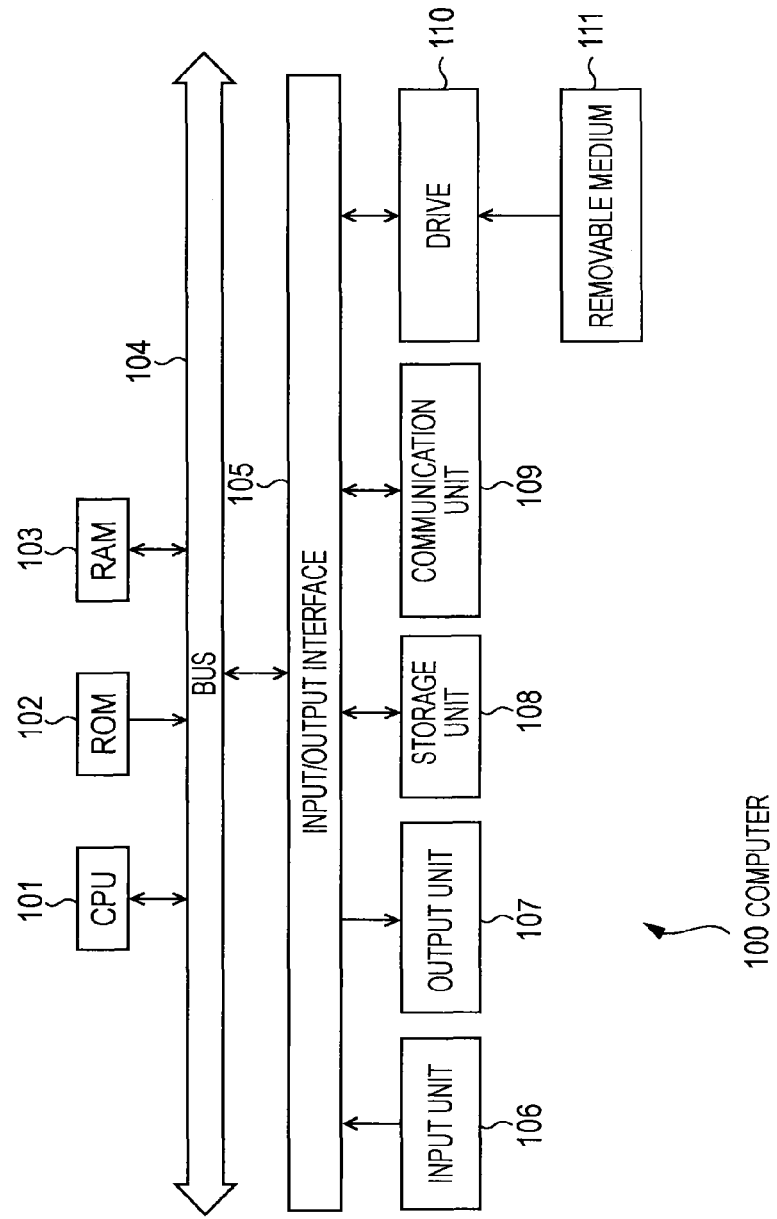

TRANSMITTING APPARATUS, TRANSMITTING METHOD, RECEIVING APPARATUS, RECEIVING METHOD, PROGRAM, AND CONTENT DISTRIBUTION SYSTEM

TECHNICAL FIELD

The present invention relates to a transmitting apparatus, a transmitting method, a receiving apparatus, a receiving method, a program, and a content distribution system and, in particular, to a transmitting apparatus, a transmitting method, a receiving apparatus, a receiving method, a program, and a content distribution system suitable for distributing content using one of a network and an on-air broadcast depending on the time and situation.

BACKGROUND ART

Services for distributing content, such as a television program or a movie, via a network, such as typically the Internet, have been realized using unicast distribution (refer to, for example, Patent Literature 1).

FIG. 1 illustrates an example of a configuration for realizing unicast distribution. Unicast distribution is realized in the following manner. Each of terminal devices 4 accesses a distribution server 1 via the Internet 2 and requests the distribution server 1 to distribute content. Thereafter, upon receiving each of the requests, the distribution server 1 distributes content to the terminal device 4 via the Internet 2. That is, in unicast distribution, the distribution server 1 and each of the terminal devices 4 performs peer-to-peer communication. In such a case, as the number of terminal devices 4 increases, the processing load of the distribution server 1 increases and, in addition, data communication traffic of the network 2 increases.

To decrease the processing load of the distribution server 1 and the communication traffic of the network 2, a router 3 of each of ISPs (internet service providers) that constitute the Internet 2 can cache content. In addition, IP multicast distribution that allows content to be multicast (broadcast) or overlay multicast distribution can be employed.

CITATION LIST

Patent Literature

PTL 1: Japanese Unexamined Patent Application Publication No. 2003-296288

SUMMARY OF INVENTION

Technical Problem

FIG. 2 illustrates an example of the configuration that realizes IP multicast distribution. In the IP multicast distribution, if the terminal device 4 that desires to join a multicast group 5 (a group of the terminal devices 4 that can receive broadcast content) sends that information to the routers 3 that constitute the Internet 2, the routers 3 cooperate to form a multicast distribution tree. By using the multicast distribution tree, content is broadcast from the distribution server 1 to only the multicast group 5.

Note that in order to realize IP multicast distribution, each of the routers 3 needs to support IP multicast distribution (needs to have a function to cooperatively form the multicast distribution tree). However, in reality, the Internet 2 is formed by the routers 3 operated by a plurality of different ISPs, and many routers 3 do not support IP multicast distribution. Accordingly, it is difficult to realize IP multicast distribution.

FIG. 3 illustrates an example of the configuration that realizes overlay IP multicast distribution. Overlay IP multicast distribution is realized by an application program running on each of the terminal devices 4 without using the function of the routers 3. That is, in overlay IP multicast distribution, upon receiving content from the distribution server 1 via the Internet 2, a terminal device 4A posts information indicating that the terminal device 4A can relay the received content to different one of the terminal devices 4. If a different one of the terminal devices 4 (e.g., a terminal device 4C) that received the posted information requests the terminal device 4A to relay the content, the terminal device 4A relays the received content to the different terminal device 4. Like the terminal device 4A, upon receiving the relayed content, the different terminal device 4 can relay the content to a different terminal device (e.g., a terminal device 4D).

In overlay IP multicast distribution, the terminal device 4C, for example, that desires the content to be relayed needs to search for the terminal device 4A that can relay the content. In addition, the terminal device 4A that relays the content is required to have processing power for maintaining an upload communication speed that is almost the same as the download communication speed of the content via the Internet 2. Furthermore, the quality of the content that is relayed many times is more degraded than the quality of the content directly distributed from the distribution server 1 (e.g., large delay occurs).

Accordingly, the present invention allows content to be stably supplied to a plurality of terminal devices.

Solution to Problem

According to a first aspect of the present invention, a transmitting apparatus for supplying content is provided. The transmitting apparatus includes transmitting means for transmitting the content to a receiving apparatus over a network, manifest file receiving means for receiving a manifest file indicating the quality of the content, where the manifest file is sent from the receiving apparatus that has received the content, analyzing means for analyzing the received manifest file, broadcasting means for distributing the content by on-air broadcast on the basis of the result of analysis of the manifest file, and distributing means for distributing the received manifest file.

The analyzing means can detect whether quality degradation has occurred in the content on the basis of the received manifest file. If quality degradation is detected in the content, the broadcasting means can distribute the content by on-air broadcast.

If the content is distributed by on-air broadcast on the basis of a result of the analysis of the manifest file, the distributing means can add information for receiving the content by on-air broadcast to the received manifest file and distribute the manifest file.

According to the first aspect of the present invention, the transmitting apparatus can further include reception report acquiring means for acquiring a reception report that is sent from the receiving apparatus that has received the content distributed by on-air broadcast and that indicates that the receiving apparatus has received the content and determining whether distribution of the content by on-air broadcast is to be continued on the basis of the number of the acquired reception reports.

If it is determined that on-air broadcast distribution of the content is not to be continued, the reception report acquiring means can control the broadcasting means to distribute a broadcast distribution stoppage announcement indicating that the on-air broadcast distribution of the content is stopped.

According to the first aspect of the present invention, a transmission method for supplying content includes a transmitting step of transmitting the content to a receiving apparatus over a network, a manifest file receiving step of receiving a manifest file indicating the quality of the content, where the manifest file is sent from the receiving apparatus that has received the content, an analyzing step of analyzing the received manifest file, a broadcasting step of distributing the content by on-air broadcast on the basis of the result of analysis of the manifest file, and a distributing step of distributing the received manifest file.

According to the first aspect of the present invention, a transmission program for controlling a transmitting apparatus that supplies content includes code for causing a computer of the transmitting apparatus to perform a process including a transmitting step of transmitting the content to a receiving apparatus over a network, a manifest file receiving step of receiving a manifest file indicating the quality of the content, where the manifest file is sent from the receiving apparatus that has received the content, an analyzing step of analyzing the received manifest file, a broadcasting step of distributing the content by on-air broadcast on the basis of the result of analysis of the manifest file, and a distributing step of distributing the received manifest file.

According to the first aspect of the present invention, content is transmitted to a receiving apparatus over a network, and a manifest file that is sent from the receiving apparatus that has received content is received. The manifest file indicates the quality of the content. Content is distributed by on-air broadcast on the basis of the result of analysis of the received manifest file.

According to a second aspect of the present invention, a receiving apparatus for receiving content includes receiving means for receiving the content transmitted over a network, sending means for generating a manifest file that indicates the quality of the received content and sending the manifest file to the transmitting apparatus, and relaying means for relaying the received content to a different receiving apparatus over the network.

According to the second aspect of the present invention, the receiving apparatus can further include manifest file acquiring means for acquiring the manifest file that is distributed from the transmitting apparatus and that is generated by a different receiving apparatus. The receiving means can access the different receiving apparatus on the basis of the acquired manifest file and receive the content relayed by the different receiving apparatus.

According to the second aspect of the present invention, the receiving apparatus can further include converting means for converting a coding scheme for the received content. The relaying means can relay the content received and having a converted coding scheme to the different receiving apparatus over the network.

The manifest file can include at least one of an amount of delay, the number of lost packets, and an amount of jitter as the information indicating the quality of the content.

According to the second aspect of the present invention, a receiving method for use in a receiving apparatus for receiving content includes a receiving step of receiving the content transmitted over a network through the receiving method, sending step of generating a manifest file indicating the quality of the received content and sending the manifest file to the transmitting apparatus, and relaying step of relaying the received content to a different receiving apparatus over the network.

According to the second aspect of the present invention, a program for controlling a receiving apparatus for receiving content includes code for causing a computer of the receiving apparatus to perform a process including a receiving step of receiving the content transmitted over a network through the receiving method, sending step of generating a manifest file indicating the quality of the received content and sending the manifest file to the transmitting apparatus, and relaying step of relaying the received content to a different receiving apparatus over the network.

According to the second aspect of the present invention, content transmitted over a network is received, a manifest file indicating the quality of the received content is generated and is sent to the transmitting apparatus, and the received content is relayed to a different receiving apparatus over the network.

According to a third aspect of the present invention, a content distribution system includes a transmitting apparatus for transmitting content and a receiving apparatus for receiving the content. The transmitting apparatus includes transmitting means for transmitting the content to the receiving apparatus over a network, manifest file receiving means for receiving a manifest file that indicates the quality of the content and that is sent from the receiving apparatus that has received the content, distributing means for distributing the received manifest file, analyzing means for analyzing the received manifest file, and broadcasting means for distributing the content by on-air broadcast on the basis of the result of analysis of the manifest file. The receiving apparatus includes content receiving means for receiving the content transmitted over the network, sending means for generating a manifest file that indicates the quality of the received content and sending the manifest file to the transmitting apparatus, and relaying means for relaying the received content to a different receiving apparatus over the network.

According to the third aspect of the present invention, content is transmitted to the receiving apparatus by the transmitting apparatus over a network. A manifest file that indicates the quality of the content and that is sent from the receiving apparatus that has received the content is received, and the content is distributed by on-air broadcast on the basis of the result of analysis of the received manifest file. In addition, the content transmitted over the network is received by the receiving apparatus, a manifest file indicating the quality of the received content is generated and is sent to the transmitting apparatus, and the received content is relayed to a different receiving apparatus over the network.

Advantageous Effects of Invention

According to the first aspect of the present invention, content can be stably transmitted to a plurality of receiving apparatuses.

According to the second aspect of the present invention, the content is stably received.

According to the third aspect of the present invention, the content is stably distributed to a plurality of receiving apparatuses.

BRIEF DESCRIPTION OF DRAWINGS

FIG. 11 is a flowchart of the process performed by the manifest file distribution server.

FIG. 12 illustrates an operation scenario to be performed by the content distribution system.

FIG. 13 illustrates an operation scenario to be performed by the content distribution system.

FIG. 14 illustrates an operation scenario to be performed by the content distribution system.

FIG. 15 is a block diagram of an example of the configuration of a computer.

DESCRIPTION OF EMBODIMENTS

The best mode for carrying out the invention (hereinafter referred to as an "embodiment") is described in detail below with reference to the accompanying drawings.

1. Embodiment

Example of Configuration of Content Distribution System

Figure 1:
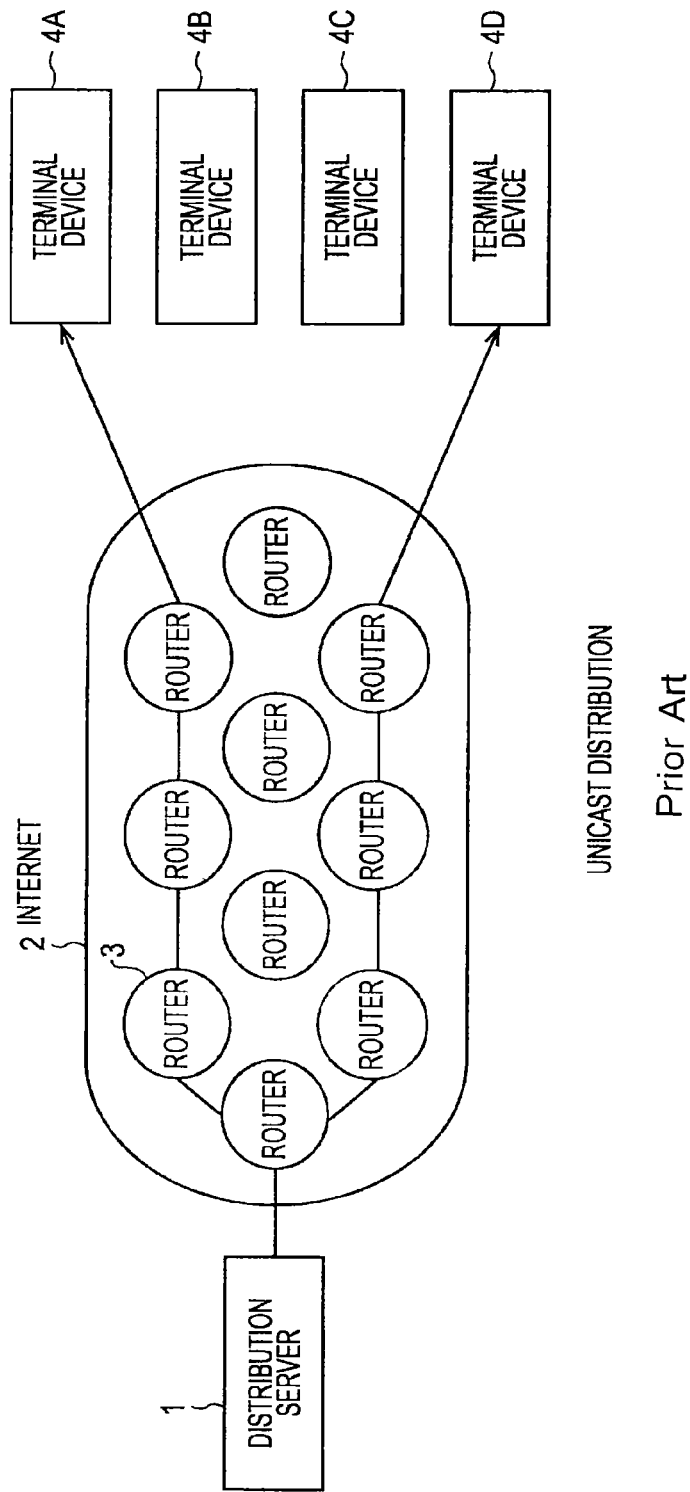
FIG. 1 is a block diagram of an example of a configuration for realizing unicast distribution of content.
Figure 2:
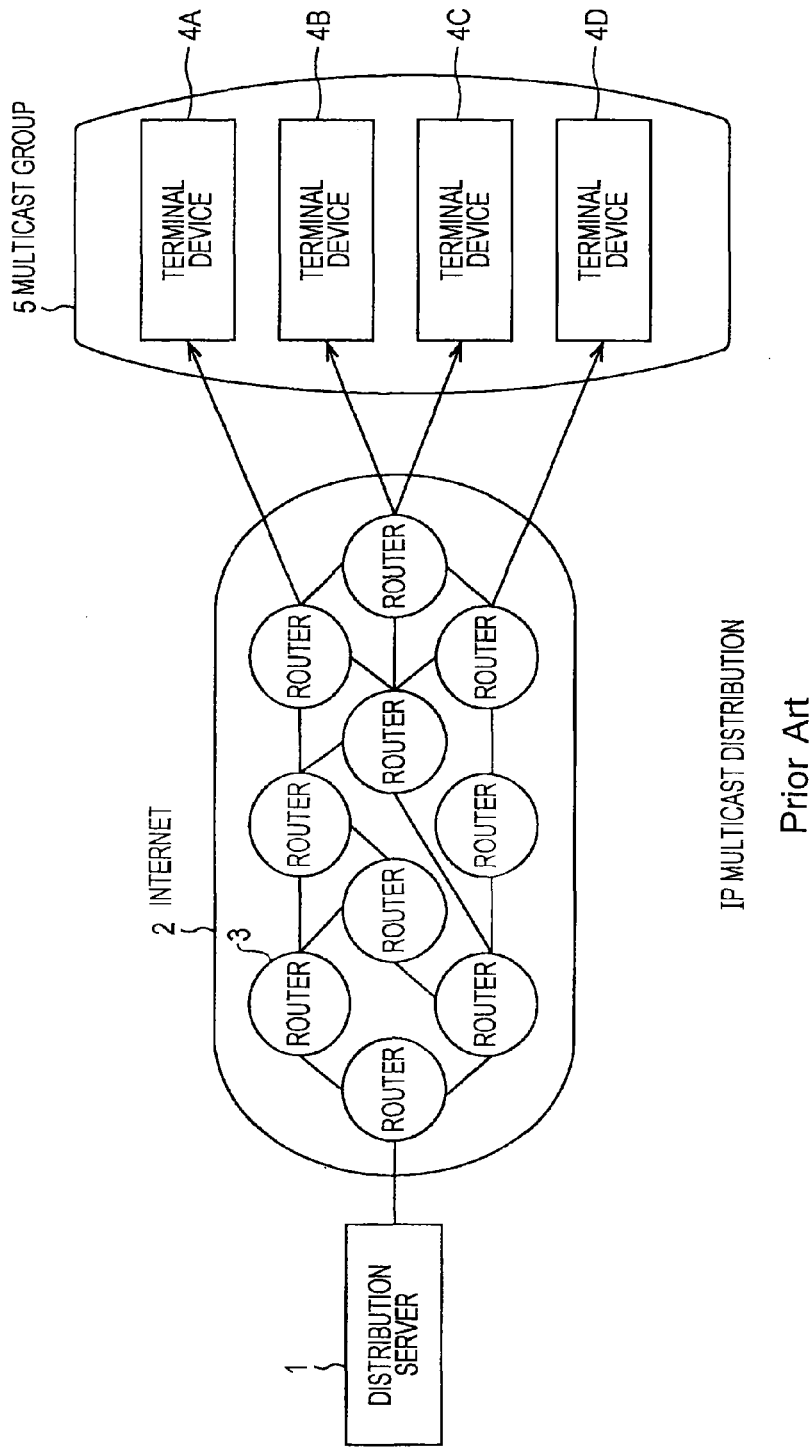
FIG. 2 is a block diagram of an example of a configuration for realizing IP multicast distribution of content.
Figure 3:
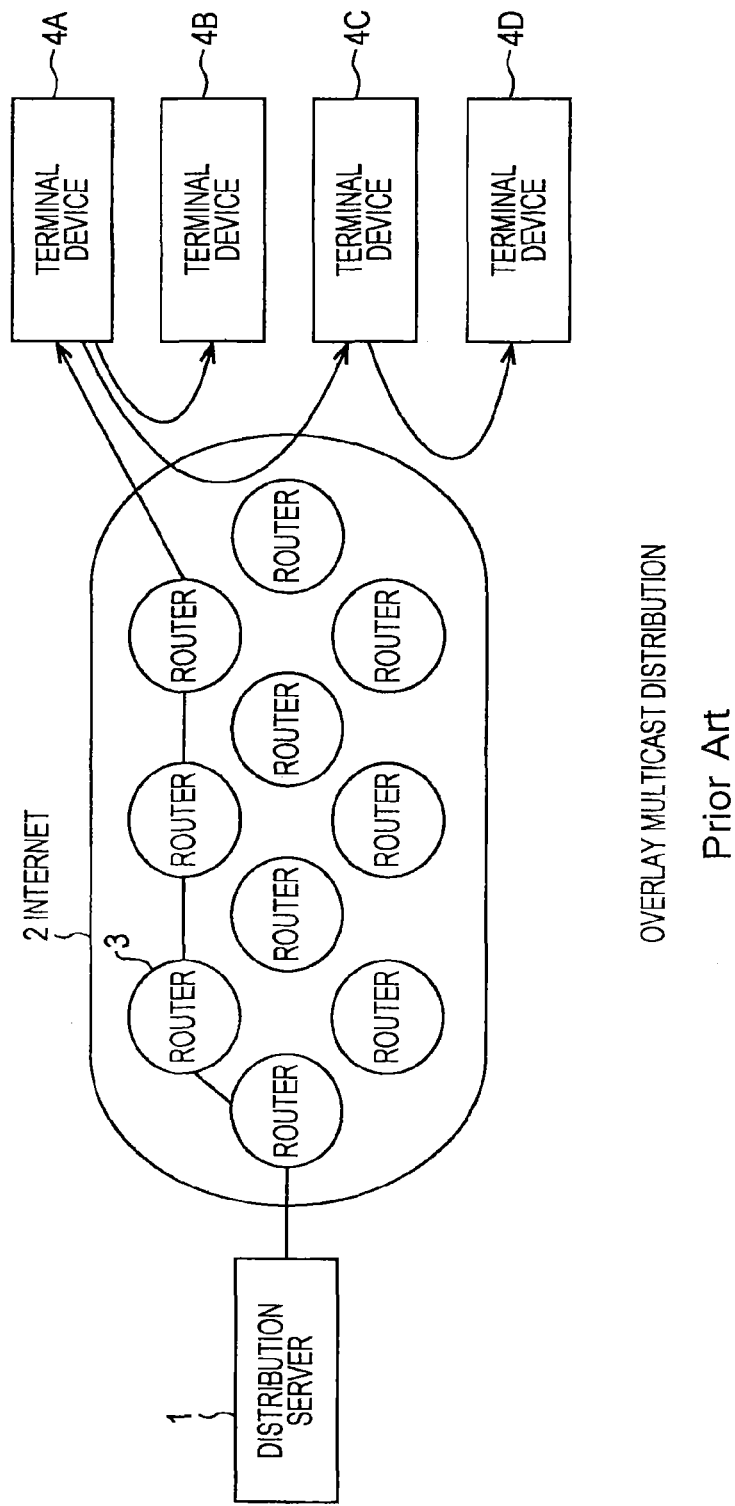
FIG. 3 is a block diagram of an example of a configuration for realizing overlay multicast distribution of content.
Figure 4:
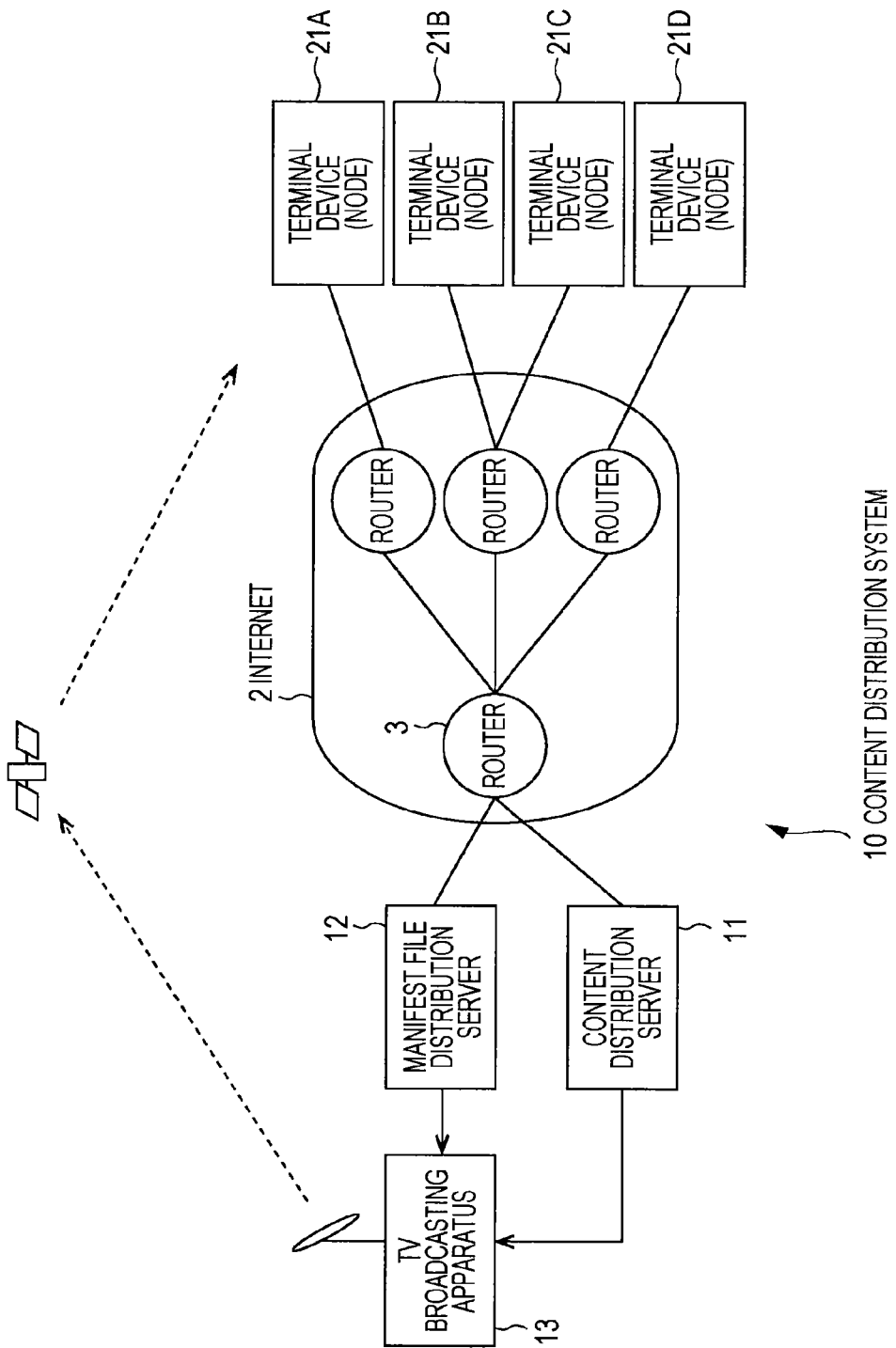
FIG. 4 is a block diagram of an example of the configuration of a content distribution system according to the present invention.

FIG. 4 illustrates an example of the configuration of a content distribution system according to an embodiment of the present invention. A content distribution system 10 includes a content distribution server 11, a manifest file distribution server 12, and a TV broadcasting apparatus 13 disposed on a transmitter (supplier) side of content and a plurality of terminal devices 21 disposed on a receiver (acquirer) side of the content. Each of the terminal devices 21 can communicate with the content distribution server 11 and the manifest file distribution server 12 via the Internet 2.

Hereinafter, each of the terminal devices 21 is also referred to as a "node". In addition, if the individual terminal devices 21 are of particular interest, the terminal devices 21 are referred to as, for example, terminal devices 21A and 21B (nodes A and B).

The content distribution server 11 executes streaming distribution of content over, mainly, the Internet 2. The manifest file distribution server 12 distributes a manifest file sent from each of the terminal devices 21 over, mainly, a TV broadcast network. In addition, upon receiving a request from the terminal device 21, the manifest file distribution server 12 supplies the manifest file to the terminal device 21 over the Internet 2.

The TV broadcasting apparatus 13 mainly distributes a stream of content by on-air broadcast under the control of the content distribution server 11. In addition, the TV broadcasting apparatus 13 distributes the manifest file over a TV broadcast network under the control of the manifest file distribution server 12. Note that the TV broadcast network used by the TV broadcasting apparatus 13 is not limited to a satellite broadcast network, a digital terrestrial broadcasting network, a cable TV broadcast network, and a mobile telephone broadcast network. Any broadcast network can be employed.

Each of the terminal devices 21 prestores the URLs of the content distribution server 11 and the manifest file distribution server 12. The terminal device 21 can communicate with the content distribution server 11 and the manifest file distribution server 12 via the Internet 2.

Figure 5:
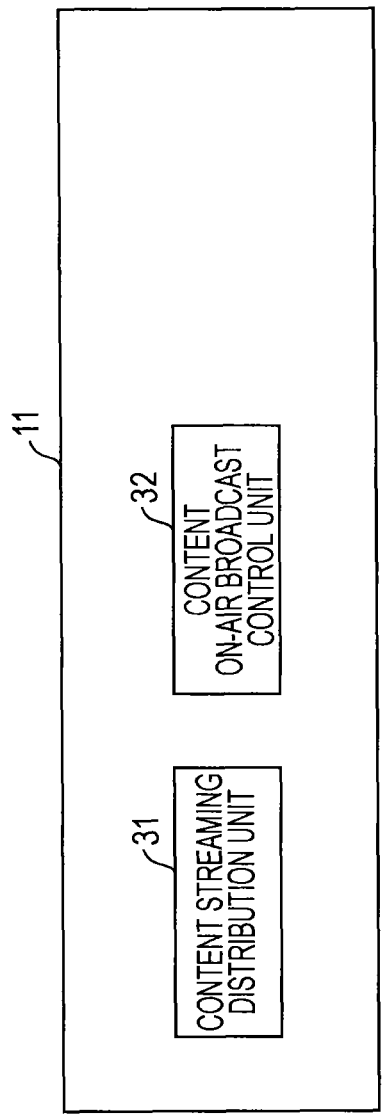
FIG. 5 is a block diagram of an example of the configuration of the content distribution server.

FIG. 5 illustrates an example of the configuration of the content distribution server 11. The content distribution server 11 includes a content streaming distribution unit 31 and a content on-air broadcast control unit 32. Upon receiving a request from the terminal device 2 via the Internet 2, the content streaming distribution unit 31 distributes a stream of content via the Internet 2. Upon receiving information from the manifest file distribution server 12, the content on-air broadcast control unit 32 controls the TV broadcasting apparatus 13 to distribute a stream of the content by on-air broadcast.

Figure 6:
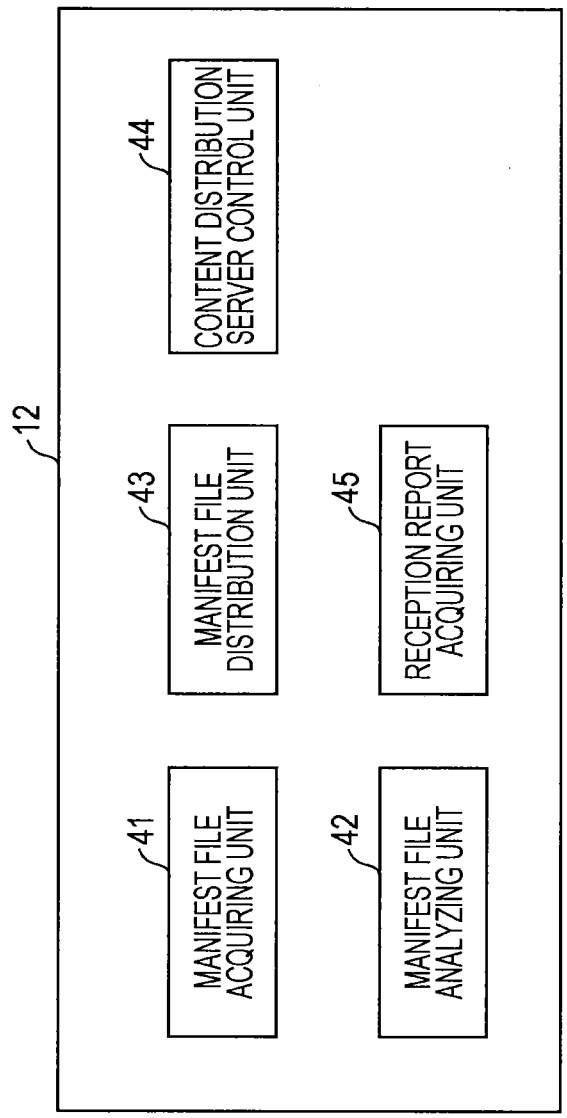
FIG. 6 is a block diagram of an example of the configuration of a manifest file distribution server.

FIG. 6 illustrates an example of the configuration of the manifest file distribution server 12. The manifest file distribution server 12 includes a manifest file acquiring unit 41, a manifest file analyzing unit 42, a manifest file distribution unit 43, a content distribution server control unit 44, and a reception report acquiring unit 45.

The manifest file acquiring unit 41 acquires the manifest file which is periodically sent from the terminal devices 21 that are acquiring the content. Herein, the manifest file includes the following information (hereinafter referred to as "relay quality information"): an amount of delay and packet loss when the terminal device 21 that acquires content acquired the content. Note that the manifest file is described in more detail below with reference to FIG. 8.

The manifest file analyzing unit 42 analyzes the relay quality information in the manifest file acquired by the manifest file acquiring unit 41.

The manifest file distribution unit 43 instructs, via the content distribution server control unit 44, the TV broadcasting apparatus 13 to broadcast the manifest file acquired by the manifest file acquiring unit 41. In addition, the manifest file distribution unit 43 supplies the manifest file acquired by the manifest file acquiring unit 41 to the terminal device 21 that has sent the request via the Internet 2.

The content distribution server control unit 44 controls the content distribution server 11 to start and stop streaming distribution of content over on-air broadcast.

The reception report acquiring unit 45 instructs, via the content distribution server control unit 44, the TV broadcasting apparatus 13 to broadcast a reception report request. As used herein, the term "reception report" refers to a return message from the terminal device 21 that is receiving the streaming content distributed by on-air broadcast. The reception report is used to measure the total number of the terminal devices 21 that are receiving the content.

Figure 7:
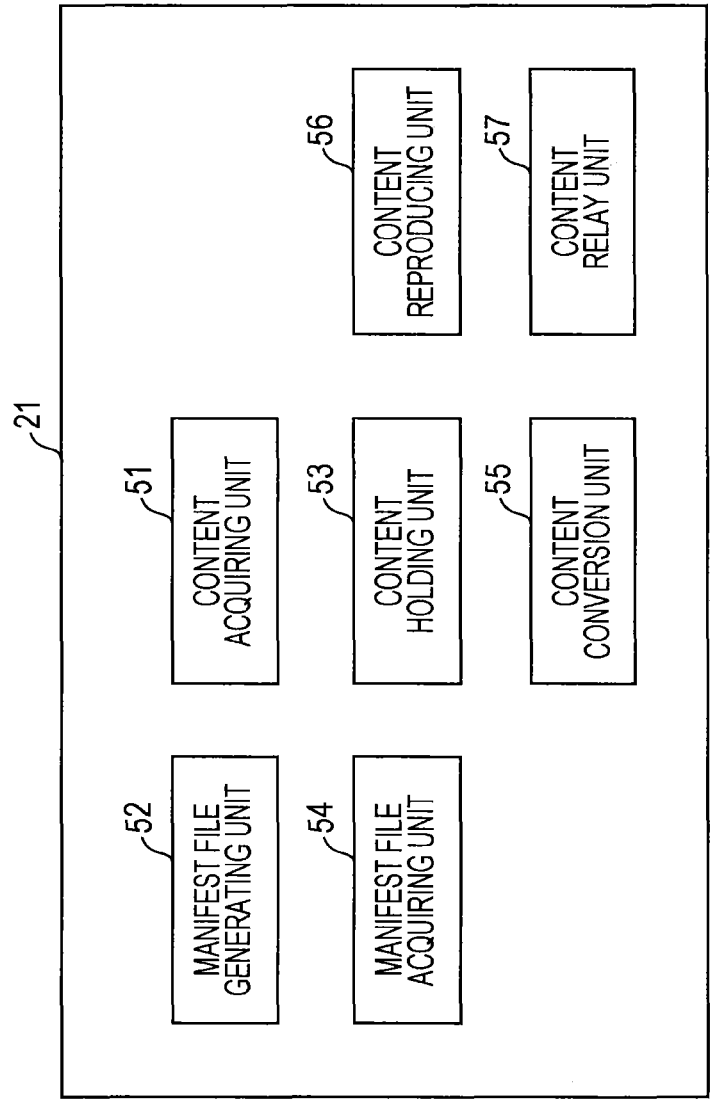
FIG. 7 is a block diagram of an example of the configuration of a terminal device.

FIG. 7 illustrates an example of the configuration of the terminal device 21. The terminal devices 21 includes a content acquiring unit 51, a manifest file generating unit 52, a content holding unit 53, a manifest file acquiring unit 54, a content conversion unit 55, a content reproducing unit 56, and a content relay unit 57.

The content acquiring unit 51 accesses the content distribution server 11 having a known URL over the Internet 2 and acquires, from the content distribution server 11, streaming content to be distributed. In addition, the content acquiring unit 51 accesses another one of the terminal devices 21 on the basis of the distributed manifest file and acquires the content to be relayed by the terminal device 21. Furthermore, if a desired streaming content is distributed by on-air broadcast, the content acquiring unit 51 receives the broadcasting signal and acquires the content.

The manifest file generating unit 52 generates a manifest file corresponding to the acquired content and transmits the generated manifest file to the manifest file distribution server 12 over the Internet 2.

Figure 8:
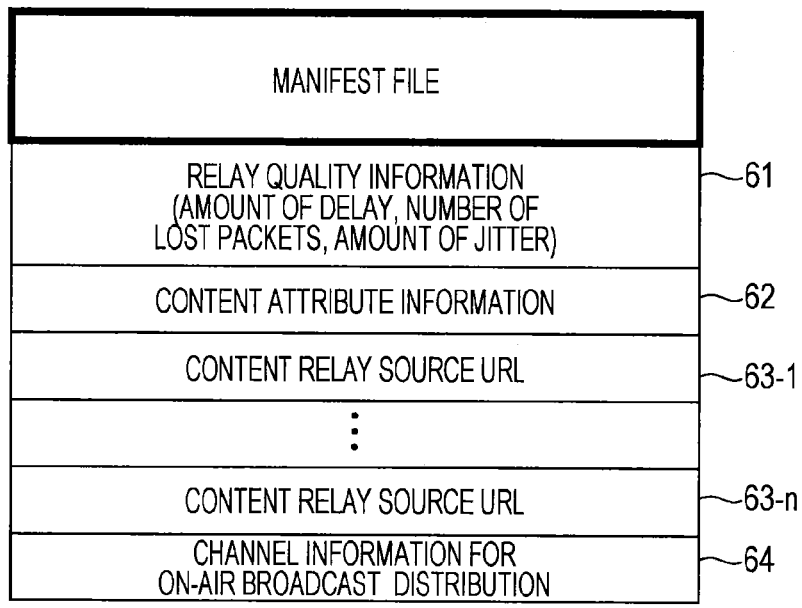
FIG. 8 is a diagram illustrating information included in a manifest file.

FIG. 8 illustrates the items of the manifest file. The manifest file is formed from relay quality information 61, attribute information 62, and at least one content relay source URL 63. In addition, the manifest file may additionally include channel information 64 used at the time of on-air broadcast distribution.

The relay quality information 61 includes the amount of delay, the number of lost packets, and the amount of jitter the acquired content experiences. The relay quality information 61 indicates the quality of content that the terminal device 21 can relay to another one of the terminal devices 21. The relay quality information 61 is used by another terminal device 21 to determine whether to request the terminal device 21 to relay the content.

At that time, the amount of delay is determined using, as a reference, a point in time at which the content is distributed from the content distribution server 11. The amount of delay is computed as a difference between the time at which the terminal device 21 receives the content and the transmission time included in a streaming packet of the content.

The attribute information 62 includes meta data of a story attribute formed from the title of the content and the plot of the content, the original bit rate of the content, the codec type, and meta data of coding attribute indicating, for example, the types of codec convertible by the terminal device 21.

The content relay source URL 63 includes the URL of a communication port of the content relay unit 57 for each of the types of codec convertible by the terminal device 21. However, if the terminal device 21 does not have a function to convert, for example, the codec of the original content, the content relay source URL 63 includes only one URL.

At the time of on-air broadcast distribution at which the corresponding content is streamed and distributed by on-air broadcast, the channel information 64 is added by the manifest file distribution server 12. At the time of on-air broadcast distribution, the channel information 64 includes a broadcast channel through which the streaming content is distributed.

Referring back to FIG. 7, the content holding unit 53 temporarily holds the content acquired by the content acquiring unit 51.

The manifest file acquiring unit 54 automatically acquires the manifest file that is broadcast from the TV broadcasting apparatus 13 and that is generated by another one of the terminal devices 21. In addition, the manifest file acquiring unit 54 can access the manifest file distribution server 12 over the Internet 2 and request the manifest file distribution server 12 to supply the manifest file generated by another terminal device 21. In such a case, the manifest file distribution server 12 supplies the manifest file over the Internet 2.

The content conversion unit 55 converts the content coding scheme (e.g., the bit rate and codec) held by the content holding unit 53 into at least one of predetermined content coding schemes and outputs the content coding scheme to the content relay unit 57. Note that the types of coding scheme convertible by the content conversion unit 55 can be determined in accordance with the processing power of the terminal device 21. In addition, the need for the content conversion unit 55 may be eliminated, that is, the acquired content may be directly relayed.

The content reproducing unit 56 reproduces the content held by the content holding unit 53 and outputs the resultant video signal and audio signal to, for example, a monitor (not shown) disposed downstream thereof.

The content relay unit 57 has a plurality of communication ports for the Internet 2. The content relay unit 57 streams and distributes, to the different terminal device 21, the content held by the content holding unit 53 or the content converted using the coding scheme converted by the content conversion unit 55 in accordance with the communication port through which the different terminal device 21 accesses over the Internet 2.

[Operations]

The operations performed by the content distribution system 10 is described next.

Figure 9:
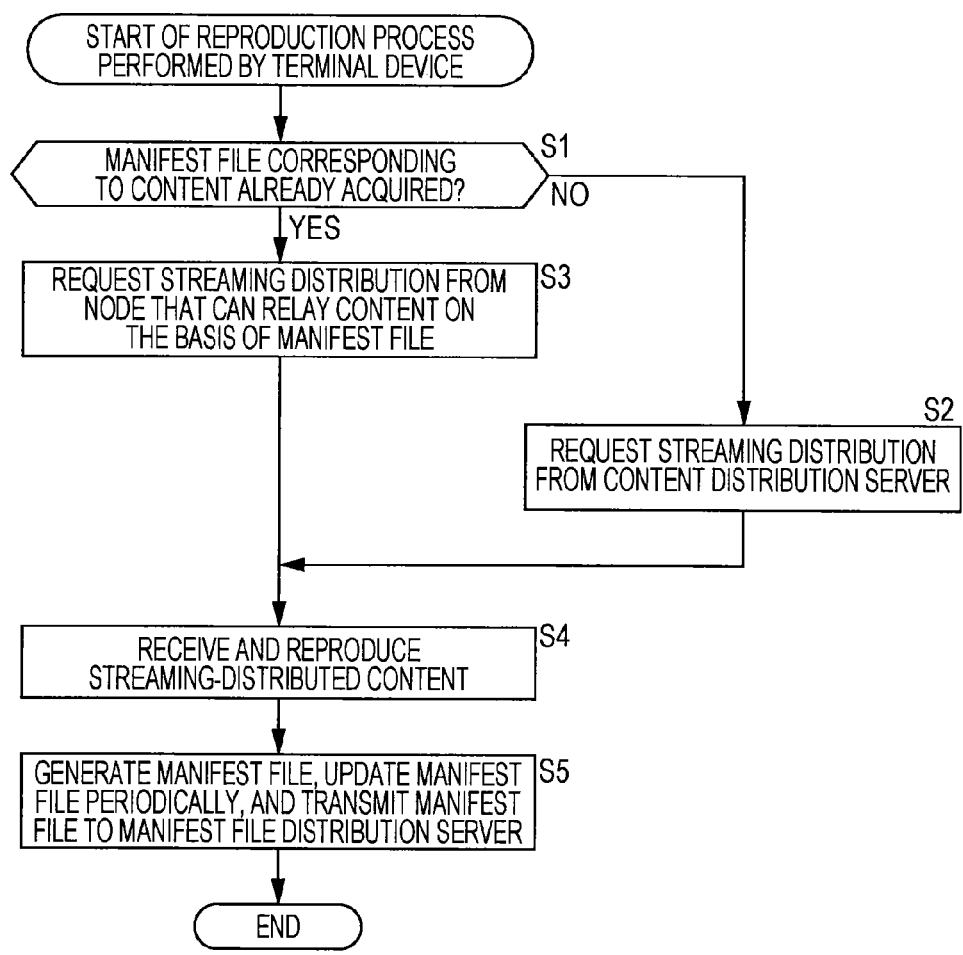
FIG. 9 is a flowchart illustrating a reproduction process performed by the terminal device.

FIG. 9 is a flowchart illustrating a reproduction process performed by the terminal device 21. The reproduction process is started when a user of the terminal device 21 selects content that the user wants to view and listen through a predetermined operation.

In step S1, the content acquiring unit 51 determines whether the manifest file corresponding to the selected content has already been acquired by the manifest file acquiring unit 54. If it is determined that the corresponding manifest file has yet not been acquired, the processing proceeds to step S2.

In step S2, the content acquiring unit 51 accesses the known content distribution server 11 over the Internet 2 and requests the content distribution server 11 to stream and distribute the selected content. Upon receiving the request, the content distribution server 11 starts streaming and distributing the selected content to the terminal device 21.

However, if, in step S1, it is determined that the corresponding manifest file has already been acquired, the processing proceeds to step S3. In step S3, the content acquiring unit 51 analyzes the acquired manifest file and selects a node (a different terminal device 21) that can relay the selected content. In addition, the content acquiring unit 51 accesses the selected different terminal device 21 (the communication port of the content relay unit 57 of the selected different terminal device 21) over the Internet 2 and requests the terminal device 21 to stream and distribute the selected content. Upon receiving the request, the different terminal device 21 starts streaming and distributing the selected content to the terminal device 21.

In step S4, the content acquiring unit 51 receives the content distribution of which has just started. The received content is stored in the content holding unit 53 and, at the same time, the content reproducing unit 56 starts reproducing the received content.

In step S5, the manifest file generating unit 52 generates a manifest file corresponding to the received content and transmits the generated manifest file to the manifest file distribution server 12 over the Internet 2. In addition, while the content is being received, the manifest file generating unit 52 updates the manifest file in accordance with a change in the reception state (e.g., the amount of delay) and transmits the updated manifest file to the manifest file distribution server 12. The transmitted manifest file is distributed from the TV broadcasting apparatus 13 by on-air broadcast at intervals under the control of the manifest file distribution server 12. This is the end of the description of the reproduction process performed by the terminal device 21.

Figure 10:
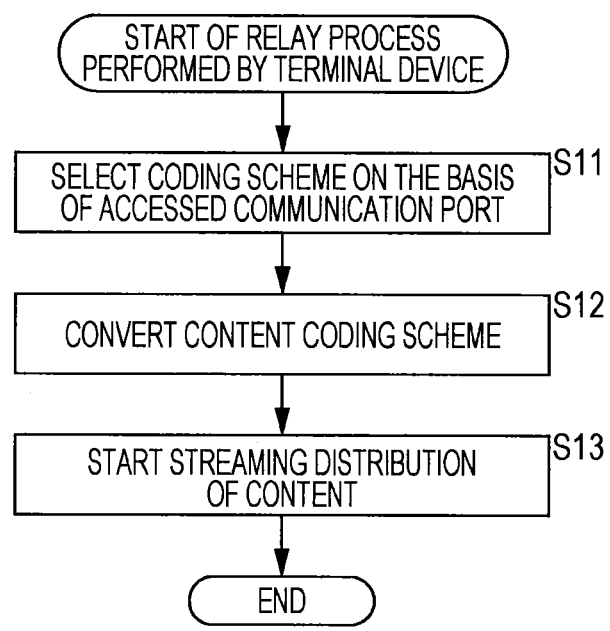
FIG. 10 is a flowchart of a relay process performed by the terminal device.

Subsequently, FIG. 10 is a flowchart of a relay process performed by the terminal device 21. The relay process starts when a different terminal device 21 accesses the content relay unit 57 over the Internet 2.

In step S11, the content conversion unit 55 selects one of the coding schemes in accordance with the communication port of the content relay unit 57 that the different terminal device 21 uses for the access. In step S12, the content conversion unit 55 converts the content coding scheme held by the content holding unit 53 into the coding scheme selected in step S11 and outputs the converted coding scheme to the content relay unit 57. Note that if the coding scheme selected in step S11 is the same as the content coding scheme held in the content holding unit 53, the content conversion unit 55 directly output the held content to the content relay unit 57.

In step S13, through the communication port through which the different terminal device 21 uses for the access and the Internet 2, the content relay unit 57 starts streaming and distributing the content input from the content conversion unit 55. This is the end of the description of the relay process performed by the terminal device 21.

Subsequently, FIG. 11 is a flowchart of the process performed by the manifest file distribution server 12. The manifest file distribution server 12 repeatedly and continuously performs a process described below.

In step S21, the manifest file acquiring unit 41 waits until it is determined that the number of the received manifest files transmitted from the terminal devices 21 over the Internet 2 have reached a predetermined number. If it is determined that a predetermined number of the manifest files have received, the processing proceeds to step S22.

In step S22, the manifest file analyzing unit 42 analyzes the relay quality information in the received manifest file and determines whether quality degradation occurs in the content distributed or relayed over the Internet 2. More specifically, if the ratio of the number of manifest files having the relay quality information including at least one of the amount of delay, the number of lost packets, and the amount of jitter that exceeds a predetermined threshold value to the predetermined number of received manifest files is higher than a certain reference value, it is determined that quality degradation occurs.

If it is determined that quality degradation does not occur in the content distributed or relayed over the Internet 2, the processing proceeds to step S23. In step S23, the manifest file distribution unit 43 controls the TV broadcasting apparatus 13 to distribute the received manifest file by on-air broadcast. Thereafter, the processing returns to step S21.

If, in step S22, it is determined that quality degradation occurs in the content distributed or relayed over the Internet 2, the processing proceeds to step S24. In step S24, the content distribution server control unit 44 requests the content distribution server 11 to stream and distribute the content corresponding to the received manifest file by on-air broadcast. Upon receiving the request, the content on-air broadcast control unit 32 of the content distribution server 11 controls the TV broadcasting apparatus 13 to start streaming distribution of the content by on-air broadcast.

In step S25, the manifest file distribution unit 43 updates the received manifest file, that is, the manifest file distribution unit 43 adds the channel information 64 to the received manifest file. Thereafter, the manifest file distribution unit 43 distributes the updated manifest file by on-air broadcast. In addition, the manifest file distribution unit 43 supplies, over the Internet 2, the updated manifest file to the terminal device 21 that has sent the request.

After then, the content is streamed and distributed not only over the Internet 2 but also over a broadcast network. At that time, each of the terminal devices 21 detects, using the updated manifest file, that the content is distributed by on-air broadcast. Accordingly, each of the terminal devices 21 capable of receiving broadcast data receives the content stably distributed by on-air broadcast.

In step S26, the reception report acquiring unit 45 requests the TV broadcasting apparatus 13 to distribute a reception report request. Upon receiving the request, the TV broadcasting apparatus 13 distributes the reception report request by on-air broadcast. The reception report request is received by each of the terminal devices 21 that are receiving the content streamed and distributed by on-air broadcast. Thereafter, the terminal device 21 that has received the reception report request sends back a reception report indicating that the content distributed by on-air broadcast is currently being received to the manifest file distribution server 12 over the Internet 2.

In step S27, the reception report acquiring unit 45 evaluates a broadcast cost on the basis of the number of reception reports sent back from the terminal devices 21 that are receiving the content distributed by on-air broadcast. In addition, in step S28, the reception report acquiring unit 45 determines whether the streaming distribution of content by on-air broadcast is to be continued.

That is, if content is streamed and distributed by on-air broadcast, the cost is higher than in streaming distribution of the content over the Internet 2. At that time, it is determined whether the streaming distribution by on-air broadcast still continues on the basis of whether a number of viewers that compensates for the cost are present. More specifically, if the number of reception reports sent back is greater than or equal to a predetermined threshold value, it is determined that the streaming distribution by on-air broadcast is to be continued.

If, in step S28, it is determined that the streaming distribution of content by on-air broadcast is to be continued, the processing returns to step S26. Thereafter, steps S26 to S28 are repeated.

Subsequently, when the number of viewers of the content streamed and distributed by on-air broadcast (the number of sent-back reception reports) decreases and if it is determined that the streaming distribution of content by on-air broadcast is to be stopped, the processing proceeds to step S29.

In step S29, the reception report acquiring unit 45 requests the TV broadcasting apparatus 13 to distribute a broadcast distribution stoppage announcement indicating that the streaming distribution by on-air broadcast soon stops. Upon receiving the request, the TV broadcasting apparatus 13 distributes the broadcast distribution stoppage announcement by on-air broadcast. Each of the terminal devices 21 that have received the broadcast distribution stoppage announcement changes content acquisition by on-air broadcast to content acquisition over the Internet 2. Thereafter, the terminal devices 21 transmit a manifest file indicating the quality of the received content to the manifest file distribution server 12.

In step S30, the manifest file acquiring unit 41 receives the manifest files transmitted from the terminal devices 21. The manifest file analyzing unit 42 analyzes the relay quality information in the received manifest file and waits until it is determined that the quality degradation of the content distributed or relayed over the Internet 2 has recovered. More specifically, it is determined that the quality degradation is recovered if the ratio of the number of manifest files having the relay quality information including at least one of the amount of delay, the number of lost packets, and the amount of jitter that exceeds a predetermined threshold value to the predetermined number of received manifest files is lower than a certain reference value.

If, in step S30, it is determined that the quality degradation of the content distributed or relayed over the Internet 2 has been recovered, the processing proceeds to step S31.

In step S31, the content distribution server control unit 44 requests the content distribution server 11 to stop streaming and distributing the content corresponding to the received manifest file by on-air broadcast. The manifest file distribution unit 43 distributes the received manifest file by on-air broadcast. In addition, the manifest file distribution unit 43 supplies the manifest file to the terminal device 21 that has sent a request over the Internet 2.

Upon receiving the request from the content distribution server control unit 44, the content on-air broadcast control unit 32 of the content distribution server 11 controls the TV broadcasting apparatus 13 to start streaming distribution of the content by on-air broadcast. Thereafter, the processing returns to step S21. Subsequently, step S21 and the subsequent steps are repeated. This is the end of the description of the process performed by the manifest file distribution server 12.

Note that descriptions of the operations performed by the content distribution server 11 and the TV broadcasting apparatus 13 are included in the description of the operation performed by the manifest file distribution server 12. Accordingly, the descriptions are not repeated.

[Supposed Operation Scenario]

A supposed operation scenario for the content distribution system 10 is described next with reference to FIGS. 12 to 14.

FIG. 12 illustrates an operation scenario in the case in which a terminal device 21A (a node A) acquires content X from the content distribution server 11, a terminal device 21B (a node B) acquires the content X relayed by the node A, and a terminal device 21C (a node C) acquires the content X relayed by the node B.

If a user of the node A instructs the node A to receive the content X, the node A accesses the content distribution server 11 over the Internet 2 and requests streaming distribution of the content X from the content distribution server 11. Upon receiving the request, the content distribution server 11 starts streaming distribution of the content X to the node A over the Internet 2.

The node A that has started receiving the streaming distributed content generates a manifest file corresponding to the content X and transmits the generated manifest file to the manifest file distribution server 12 over the Internet 2.

Upon receiving the transmitted manifest file, the manifest file distribution server 12 determines whether quality degradation has occurred in the content X on the basis of the relay quality information in the manifest file. Thereafter, if it is determined that quality degradation has not occurred, the manifest file distribution server 12 instructs the TV broadcasting apparatus 13 to directly distribute the manifest file by on-air broadcast.

The distributed manifest file is received by each of the nodes. Thereafter, if a user of the node B instructs the node B to receive the content X, the node B refers to the prestored manifest file that corresponds to the content X and that is generated by the node A and requests streaming distribution (relay) of the content from the node A. Upon receiving the request, the node A starts streaming distribution (relay) of the content X to the node B over the Internet 2.

The node B that has started receiving the relayed content generates a manifest file corresponding to the content X relayed by the node A and transmits the generated manifest file to the manifest file distribution server 12 over the Internet 2.

Upon receiving the transmitted manifest file, the manifest file distribution server 12 determines whether quality degradation has occurred in the content X on the basis of the relay quality information in the manifest file. Thereafter, if it is determined that quality degradation has not occurred, the manifest file distribution server 12 instructs the TV broadcasting apparatus 13 to directly distribute the manifest file by on-air broadcast.

The distributed manifest file is received by each of the nodes. Subsequently, if a user of the node C instructs the node C to receive the content X, the node C refers to the prestored manifest file that corresponds to the content X and that is generated by the node A or B and requests streaming distribution (relay) of the content from the node B. Upon receiving the request, the node B starts streaming distribution (relay) of the content X to the node C over the Internet 2.

Subsequently, FIG. 13 illustrates an operation scenario in the case in which when quality degradation occurs in the relayed content X, the content X is also streaming-distributed by on-air broadcast.

Note that the operation performed when the node B acquires the content X relayed by the node A, generates a manifest file, and transmits the manifest file to the manifest file distribution server 12 is the same as the above description made with reference to FIG. 12. Accordingly, the description is not repeated.

Upon receiving the manifest file transmitted from the node B, the manifest file distribution server 12 determines whether quality degradation has occurred in the content X on the basis of the relay quality information in the manifest file. At that time, if it is determined that quality degradation has occurred, the manifest file distribution server 12 requests the content distribution server 11 to perform control to start distributing the content X by on-air broadcast. Upon receiving the request, the content distribution server 11 controls the TV broadcasting apparatus 13 to start streaming distribution of the content X by on-air broadcast.

Furthermore, the manifest file distribution server 12 updates the manifest file transmitted from the node B (adds the channel information 64 for distribution by on-air broadcast to the manifest file) and instructs the TV broadcasting apparatus 13 to distribute the manifest file by on-air broadcast.

The distributed manifest file is received by each of the nodes. Thereafter, when each of the node receives the content X, the node receives the content X streaming-distributed by on-air broadcast.

Subsequently, FIG. 14 illustrates an operation scenario in the case in which when the number of viewers of the content X streaming-distributed by on-air broadcast decreases, the streaming distribution of the content X by on-air broadcast is stopped.

After the content X is streaming-distributed by on-air broadcast, the manifest file distribution server 12 requests the TV broadcasting apparatus 13 to distribute a reception report request. Upon receiving the request, the TV broadcasting apparatus 13 distributes a reception report request by on-air broadcast. The distributed reception report request is received by each of the nodes that are receiving the content X. The node that has received the reception report request sends back, to the manifest file distribution server 12, a reception report indicating that it is receiving the content X streaming-distributed by on-air broadcast.

Upon receiving the reception reports, the content distribution server 11 evaluates the cost of broadcast on the basis of the number of the reception reports sent back from the nodes and determines whether the streaming distribution of the content X by on-air broadcast is to be continued.

At that time, if the content distribution server 11 determines that the streaming distribution of the content X by on-air broadcast is not to be continued, the content distribution server 11 requests the TV broadcasting apparatus 13 to distribute a broadcast distribution stoppage announcement. Upon receiving the request, the TV broadcasting apparatus 13 distributes the broadcast distribution stoppage announcement by on-air broadcast. Upon receiving the broadcast distribution stoppage announcement, the node A accesses the content distribution server 11 over the Internet 2 and requests the content distribution server 11 to streaming-distribute the content X. Upon receiving the request, the content distribution server 11 starts streaming-distributing the content X to the node A over the Internet 2.

Note that like the node A, the node B can request streaming distribution of the content X to the content distribution server 11.

The node A that has started receiving the streaming-distributed content generates a manifest file corresponding to the content X and transmits the generated manifest file to the manifest file distribution server 12 over the Internet 2.

Upon receiving the transmitted manifest file, the manifest file distribution server 12 determines whether quality degradation has occurred in the content X on the basis of the relay quality information in the manifest file. At that time, if it is determined that quality degradation has not occurred, the manifest file distribution server 12 instructs the TV broadcasting apparatus 13 to directly distribute the manifest file by on-air broadcast.

The node B that does not request streaming distribution of the content X to the content distribution server 11 refers to the distributed manifest file and requests streaming distribution (relay) of the content from the node A. Upon receiving the request, the node A starts streaming distribution (relay) of the content X to the node B over the Internet 2.

The node B that has started receiving the relayed content generates a manifest file corresponding to the content X relayed by the node A and transmits the generated manifest file to the manifest file distribution server 12 over the Internet 2.

Upon receiving the transmitted manifest file, the manifest file distribution server 12 determines whether the quality degradation has occurred in the content X on the basis of the relay quality information in the manifest file and determines whether the quality degradation is recovered. Thereafter, if it is determined that the quality degradation is recovered, the manifest file distribution server 12 requests the content distribution server 11 to stop streaming distribution of the content X by on-air broadcast. Upon receiving the request, the content distribution server 11 instructs the TV broadcasting apparatus 13 to stop streaming distribution of the content X by on-air broadcast.

As described above, the content distribution system 10 can start and stop streaming distribution of content by on-air broadcast in accordance with quality degradation of the content relayed over the Internet 2 and the phenomenon of the viewer. Accordingly, the supplier of the content can stably supply the content to a plurality of terminal devices without increasing the cost.

While the present embodiment has been described with reference to the content distribution server 11, the manifest file distribution server 12, and the TV broadcasting apparatus 13 separately provided on the supplier side of content, any combination thereof can be provided as needed.

The terminal device 21 can incorporate, for example, a TV receiver or a video recorder.

The above-described series of processes can be executed not only by hardware but also by software. When the above-described series of processes are executed by software, the programs of the software are downloaded from a program recording medium into a computer incorporated in dedicated hardware or a computer that can execute a variety of functions by installing a variety of programs therein (e.g., a general-purpose personal computer).

FIG. 15 is a block diagram of an example of the configuration of the hardware of a computer that executes the above-described series of processes using a program.

In a computer 100, a CPU (Central Processing Unit) 101, a ROM (Read Only Memory) 102, a RAM (Random Access Memory) 103 are connected to one another via a bus 104.

In addition, an input/output interface 105 is connected to the bus 104. The input/output interface 105 has the following units connected thereto: an input unit 106 including, for example, a keyboard, a mouse, and a microphone, an output unit 107 including, for example, a speaker, a storage unit 108 including, for example, a hard disk and a nonvolatile memory, a communication unit 109 including, for example, a network interface, and a drive 110. The drive 110 drives a removable medium 111, such as a magnetic disk, an optical disk, a magnetooptical disk, or a semiconductor memory.

In the computer 100 having such a configuration, for example, the CPU 101 loads a program stored in the storage unit 108 into the RAM 103 via the input/output interface 105 and the bus 104 and executes the program. In this manner, the above-described series of processes are executed.

Note that the program executed by the computer 100 may be a program for processes performed in time-series manner described in the present specification or a program for processes performed in parallel or at a necessary point in time, such as when called.

In addition, the program may be performed by a single computer, or the program may be performed by a plurality of computers in a distributed processing manner.

In addition, as used in the present specification, the term "system" refers to a whole system including a plurality of apparatuses.

The embodiments of the present invention are not limited to those described above. Various modifications and changes may be made without departing from the broader spirit and scope of the invention.

REFERENCE SIGNS LIST 10 content distribution system
11 content distribution server
12 manifest file distribution server
13 TV broadcasting apparatus
21 terminal device
31 content streaming distribution unit
32 content on-air broadcast control unit
41 manifest file acquiring unit
42 manifest file analyzing unit
43 manifest file distribution unit
44 content distribution server control unit
45 reception report acquiring unit
51 content acquiring unit
52 manifest file generating unit
53 content holding unit
54 manifest file acquiring unit 55 content conversion unit
56 content reproducing unit
57 content relay unit

The invention claimed is:

1. A transmitting apparatus for supplying content, comprising:
   transmitting circuitry that transmits the content to a first receiving apparatus over a network;
   manifest file receiving circuitry that receives a manifest file corresponding to the content indicating a quality of the content, the manifest file being received from the first receiving apparatus that has received the content;
   analyzing circuitry that analyzes the received manifest file;
   broadcasting circuitry that distributes the content by on-air broadcast, different from the network, based on a result of analysis of the received manifest file by the analyzing circuitry;
   distributing circuitry that distributes the received manifest file to a second receiving apparatus over the network when the distributing circuitry receives a request to transmit the received manifest file from the second receiving apparatus over the network, and distributes the received manifest file to the second receiving apparatus by said on-air broadcast when the distributing circuitry does not receive the request to transmit the received manifest file from the second receiving apparatus over the network,
   wherein the second receiving apparatus determines whether to request the content from the transmitting apparatus or directly from the first receiving apparatus based on the quality of the content indicated in the received manifest file.

2. The transmitting apparatus according to claim 1, wherein the analyzing circuitry detects whether quality degradation has occurred in the content based on the received manifest file, and
   wherein if quality degradation is detected in the content, the broadcasting circuitry distributes the content by said on-air broadcast.

3. The transmitting apparatus according to claim 2, wherein if the content is distributed by said on-air broadcast based on the result of the analysis of the received manifest file, the distributing circuitry adds information for receiving the content by said on-air broadcast to the received manifest file and distributes the received manifest file.

4. The transmitting apparatus according to claim 2, further comprising:
   reception report acquiring circuitry that acquires a reception report that is sent from one of the first receiving apparatus and second receiving apparatus that has received the content distributed by said on-air broadcast and that indicates that said one of the first and second receiving apparatus has received the content, and that determines whether distribution of the content by said on-air broadcast is to be continued based on a number of acquired reception reports.

5. The transmitting apparatus according to claim 4, wherein if it is determined that said on-air broadcast distribution of the content is not to be continued, the reception report acquiring circuitry controls the broadcasting circuitry to distribute a broadcast distribution stoppage announcement indicating that said on-air broadcast distribution of the content is stopped.

6. The transmitting apparatus according to claim 1, wherein if the second receiving apparatus requests the content from the transmitting apparatus, the second receiving apparatus receives the content either by said on-air broadcast or over the network.

7. The transmitting apparatus according to claim 1, wherein the manifest file includes relay quality information of the first receiving apparatus, attribute information of the content, and at least one content relay source URL of a communication port of the first receiving apparatus.

8. The transmitting apparatus according to claim 1, wherein the first receiving apparatus sends the manifest file only to the transmitting apparatus and receives different manifest files, corresponding to different content, only from the transmitting apparatus.

9. A transmission method for supplying content, comprising:
   transmitting the content to a first receiving apparatus over a network;
   receiving a manifest file corresponding to the content indicating a quality of the content, the manifest file being received from the first receiving apparatus that has received the content;
   analyzing the received manifest file;
   distributing the content by on-air broadcast, different from the network, based on a result of said analyzing the received manifest file;
   distributing, using distributing circuitry, the received manifest file to a second receiving apparatus over the network when the distributing circuitry receives a request to transmit the received manifest file from the second receiving apparatus over the network; and
   distributing, using the distributing circuitry, the received manifest file to the second receiving apparatus by said on-air broadcast when the distributing circuitry does not receive the request to transmit the received manifest file from the second receiving apparatus over the network,
   wherein the second receiving apparatus determines whether to request the content from the transmitting apparatus or directly from the first receiving apparatus based on the quality of the content indicated in the received manifest file.

10. A non-transitory computer-readable storage medium storing computer-readable instructions that, when executed by a computer, cause the computer to execute a transmitting method for supplying content, comprising:
   transmitting the content to a first receiving apparatus over a network;
   receiving a manifest file corresponding to the content indicating a quality of the content, the manifest file being received from the first receiving apparatus that has received the content;
   analyzing the received manifest file;
   distributing the content by on-air broadcast, different from the network, based on a result of said analyzing the received manifest file; and
   distributing, using distributing circuitry, the received manifest file to a second receiving apparatus over the network when the distributing circuitry receives a request to transmit the received manifest file from the second receiving apparatus over the network; and
   distributing, using the distributing circuitry, the received manifest file to the second receiving apparatus by said on-air broadcast when the distributing circuitry does not receive the request to transmit the received manifest file from the second receiving apparatus over the network,
   wherein the second receiving apparatus determines whether to request the content from the transmitting apparatus or directly from the first receiving apparatus based on the quality of the content indicated in the received manifest file.

11. A receiving apparatus for receiving content, comprising:
receiving circuitry that receives the content transmitted over a network;
sending circuitry that generates a manifest file corresponding to the content indicating a quality of the received content and that sends the manifest file to a transmitting apparatus; and
relaying circuitry that relays the received content to a different receiving apparatus over the network, wherein
the manifest file is distributed to the different receiving apparatus, from the transmitting apparatus, over the network when the transmitting apparatus receives a request to transmit the manifest file from the different receiving apparatus over the network,
the manifest file is distributed to the different receiving apparatus, from the transmitting apparatus, by on-air broadcast, different from the network, when the transmitting apparatus does not receive the request to transmit the manifest file from the different receiving apparatus over the network, and
the different receiving apparatus determines whether to request the content from the transmitting apparatus or directly from the receiving apparatus based on the quality of the content indicated in the manifest file.

12. The receiving apparatus according to claim 11, further comprising:
manifest file acquiring circuitry that acquires another manifest file that is distributed from the transmitting apparatus and that is generated by the different receiving apparatus,
wherein the receiving circuitry accesses the different receiving apparatus based on the acquired other manifest file and receives the content relayed by the different receiving apparatus.

13. The receiving apparatus according to claim 12, further comprising:
converting circuitry that converts a coding scheme for the received content,
wherein the relaying circuitry relays the content received and having a converted coding scheme to the different receiving apparatus over the network.

14. The transmitting apparatus according to claim 12 or 13, wherein the manifest file includes at least one of an amount of delay, a number of lost packets, and an amount of jitter as information indicating the quality of the content.

15. The receiving apparatus according to claim 11, wherein the sending circuitry sends the manifest file only to the transmitting apparatus, and the receiving circuitry receives different manifest files, corresponding to different content, only from the transmitting apparatus.

16. A receiving method for use in a receiving apparatus for receiving content, comprising:
receiving the content transmitted over a network;
generating a manifest file corresponding to the content indicating a quality of the received content, and sending the manifest file to a transmitting apparatus; and
relaying the received content to a different receiving apparatus over the network, wherein
the manifest file is distributed to the different receiving apparatus, from the transmitting apparatus, over the network when the transmitting apparatus receives a request to transmit the manifest file from the different receiving apparatus over the network,
the manifest file is distributed to the different receiving apparatus, from the transmitting apparatus, by on-air broadcast, different from the network, when the transmitting apparatus does not receive the request to transmit the manifest file from the different receiving apparatus over the network, and
the different receiving apparatus determines whether to request the content from the transmitting apparatus or directly from the receiving apparatus based on the quality of the content indicated in the manifest file.

17. A non-transitory computer-readable storage medium storing computer-readable instructions that, when executed by a computer, cause the computer to execute a receiving method for receiving content, comprising:
receiving the content transmitted over a network;
generating a manifest file corresponding to the content indicating a quality of the received content, and sending the manifest file to a transmitting apparatus; and
relaying the received content to a different receiving apparatus over the network, wherein
the manifest file is distributed to the different receiving apparatus, from the transmitting apparatus, over the network when the transmitting apparatus receives a request to transmit the manifest file from the different receiving apparatus over the network,
the manifest file is distributed to the different receiving apparatus, from the transmitting apparatus, by on-air broadcast, different from the network, when the transmitting apparatus does not receive the request to transmit the manifest file from the different receiving apparatus over the network, and
the different receiving apparatus determines whether to request the content from the transmitting apparatus or directly from the receiving apparatus based on the quality of the content indicated in the manifest file.

18. A content distribution system comprising:
a transmitting apparatus that transmits content; and
a receiving apparatus that receives the content,
wherein the transmitting apparatus includes:
transmitting circuitry that transmits the content to the receiving apparatus over a network,
manifest file receiving circuitry that receives a manifest file corresponding to the content that indicates a quality of the content from the receiving apparatus that has received the content,
distributing circuitry that distributes the manifest file to a different receiving apparatus over the network when the distributing circuitry receives a request to transmit the received manifest file from the different receiving apparatus over the network, and distributes the received manifest file to the different receiving apparatus by on-air broadcast, different from the network, when the distributing circuitry does not receive the request to transmit the received manifest file from the different receiving apparatus over the network,
analyzing circuitry that analyzes the manifest file, and
broadcasting circuitry that distributes the content by said on-air broadcast based on a result of analysis of the manifest file by the analyzing circuitry, and
wherein the receiving apparatus includes:
content receiving circuitry that receives the content transmitted over the network,
sending circuitry that generates the manifest file indicating the quality of the received content and that sends the manifest file to the transmitting apparatus, and
relaying circuitry that relays the received content to the different receiving apparatus over the network, wherein the different receiving apparatus determines whether to request the content from the transmitting apparatus or directly from the receiving apparatus based on the quality of the content indicated in the manifest file.

* * * * *